United States Patent [19]

Peloquin

[11] Patent Number: 5,063,686
[45] Date of Patent: Nov. 12, 1991

[54] SELF-SUPPORTING FLEXIBLE EXTENDABLE TAPE MEASURE

[76] Inventor: Andrew L. Peloquin, 606 - 3rd St., Fair Lawn, N.J. 07410

[21] Appl. No.: 598,849

[22] Filed: Oct. 15, 1989

[51] Int. Cl.$^5$ .............................................. G01B 3/10
[52] U.S. Cl. ....................................... 33/757; 33/761; 33/764; 33/771
[58] Field of Search ................. 33/755, 757, 759, 764, 33/771, 761; 52/108; 138/119; 242/84.8

[56] References Cited

U.S. PATENT DOCUMENTS

| | | | |
|---|---|---|---|
| 1,947,392 | 2/1934 | Guntermann et al. | 52/108 |
| 2,371,556 | 3/1945 | Steffens et al. | 138/119 |
| 2,799,368 | 7/1957 | Alter | 52/108 |
| 2,920,394 | 1/1960 | Soderbergh | 33/764 |
| 3,032,151 | 5/1962 | Allen et al. | 33/755 |
| 3,213,573 | 10/1965 | Bohr et al. | 52/108 |
| 3,242,576 | 3/1966 | Wheeler | 52/108 |
| 3,343,567 | 9/1967 | Mulligan et al. | 138/119 |
| 3,508,587 | 4/1970 | Mauch | 138/119 |
| 3,862,528 | 1/1975 | Meissinger | 52/108 |
| 4,149,320 | 4/1979 | Troyer et al. | 33/758 |
| 4,275,503 | 6/1981 | Bergkvist | 242/84.8 |

FOREIGN PATENT DOCUMENTS

| | | | |
|---|---|---|---|
| 0103201 | 4/1926 | Fed. Rep. of Germany | 33/755 |
| 1221477 | 3/1986 | U.S.S.R. | 33/759 |

Primary Examiner—William A. Cuchlinski, Jr.
Assistant Examiner—Alvin Wirthlin
Attorney, Agent, or Firm—Hough, William T.

[57] ABSTRACT

In a preferred embodiment, an extendable tape measure made of polypropylene plastic has upper and lower elongated tapes having elongated sides integrally permanently connected by upright integral permanent flanges forming a squared tube of which the upper surface of the upper tape has length-indicating indicia arranged along the longitudinal axis thereof. The flanges are uprightly rigid lending support against downward bending of extended portions of the tape measure but sufficiently resilient as to be bendable at squared corners of junction with the upper and lower tapes when subjected to reforming pressure by a retraction first port in a forward face of a retraction-storage casing, to flatten the squared tubular shape to a flattened windable state during retraction. An upper inner end of one flange is enalrged and forms a first slot between that upper inner end relative to and in juxtaposition to the upper elongated tape. A lower end of a remaining other flange is enlarged and forms a second slot or space between that lower inner end relative to an in juxtaposition to the lower elongated tape. The enlarged portions and slots are positioned to resist further leaning in a direction of erection to the squared position as resiliently formed and supported by the port when the tape measure is extended to an extended state.

19 Claims, 5 Drawing Sheets

SELF-SUPPORTING FLEXIBLE EXTENDABLE TAPE MEASURE

This invention is directed to a novel self-supporting tape measure when extended.

PRIOR ART

While there is no prior art suggestive of the structure, mechanism and benefits of the present invention, patents of interest are as follow. F. Buck et al. U.S. Pat. No. 1,964,248 discloses a concave-convex shaped tape measure having a concave upper face and convex face, shown in FIG. 7 thereof to have uniform thickness and curvature between opposite elongated edges thereof. Rutty U.S. Pat. No. 4,411,072 shows a tape measure having flat top and bottom opposite faces, deformable by the extension-port to a concave-convex shape as the normally-flat tape becomes extended to an extended state, noting that such normally flat tape regains or returns to its flattened state for respective portions thereof as they become more distant from the extension-port. Tomuro U.S. Pat. No. 4,352,244 discloses a tape measure having a normally curled-over edge along a longitudinally-extending edge (or central portion) opposite (spaced) from an indicia calibrated edge, flattened during retraction by a reforming shaped retraction port such that the flattened tape measure is windable to a storage state within the tape measure storage casing. Berghvist U.S. Pat. No. 4,275,503 discloses a partially flattened tube-shaped tape measure in its extended state by which the unflattened outer tubular edges lend support to the thicker upper convo-convex tape surface, being pressable to a totally flattened state by pressure of a shaped retraction port during retraction to a stored state. Dinhofer U.S. Pat. No. 2,319,724 discloses a plurality of separate mateable wedges each separately support-wedgable within a spaced-apart receptacle holes, there being a series of such spaced-apart receptacle holes, of which the support wedges are removable prior to retraction of the tape to a stored position and state. Dinhofer U.S. Pat. No. 2,307,395 discloses substantially the same as the above-discussed Dinhofer patent, except this earlier U.S. Pat. No. 2,307,395 discloses separate removable wedge supports that do not mate with one-another.

BACKGROUND TO THE INVENTION

As evidenced by the foregoing patents there has persisted an ongoing problem with multiple differing approaches to solve the problem of the tape measure that heretofore has continued to bend and sag at its extended outer-end portions when extended beyond a few inches from the retraction storage casing. While one or more of the profered solutions of the foregoing patents may in some regards improve the situation, there remain major difficulties not overcome by and/or complicated by the foregoing patents and approaches thereof. Many conventionally available tape measures that may be purchased, have the typical shape of that set-forth by the Buck patent, yet such shape in practice fails to prevent a significantly extended length thereof from buckling downwardly when an attempt is made to suspend the extended tape horizontally by mere support of the casing itself. The same is true for the temporarily curved tape measure of Rutty. Apart from complex problems of both manufacture and operational problems in any attempt to use the irregularly shaped structures, there are space and compression problems in degree of success in retracting and winding such a tape into a storage casing, clearly the length of storable tape of such shape being likely severely limited. The Dinhofer patent's use of separate storage of inserts in totally different from the present inventor approach and invention as described herein, directed to objects set-forth below.

In actual usage, particularly for artisans with their own small businesses devoid of available helpers, it is exceedingly difficult to efficiently handle tapes of tape measures of more than a couple or three feet because of the continuing problem of the extended end portions thereof sagging or causing a downward kink even closer to the artisan's hand(s) and/or casing from which the tape extends, repeated attempts and problems associated causing repeated loss of valuable time together with the aggrevating frustrations accompanying such difficulties.

OBJECTS OF THE INVENTION

Accordingly objects of this invention include the overcoming and/or avoiding the difficulties and problems and disadvantages and short-comings of the above-noted prior art patents.

More particularly, another specific object is to obtain a novelly shaped and structured tape measures by which when horizontally extended substantially long distances from the storage casing, the extended portion elongated tape remains horizontally extending devoid of sagging, bending or buckling from its own weight.

Another object is to obtain a composite of a tape-storage tape above-noted and a tape which is adapted to lend support to the particular novelly-shaped and structured elongated tape, together with being adapted to the extent necessary to reform and fold the elongated tape as necessary for easy and complete retraction and storage of the extended portion.

Another object is to achieve one or more of the preceding objects with novel tape shape and structure resulting in the tape locked into an resiliently-open state tending to stay open for all portions thereof extended.

Another object is to obtain a novel tape above-noted inclusive of a composition resistant to breaking, tearing or shearing during repeated and prolonged use.

Another object is to obtain a novel tape above-noted inclusive of locking mechanism such that the shaped and structured elongated tape retains a shape most resistant to potential bending or buckling.

Another object is to obtain a novel tape above-noted inclusive of specific dimensions at or associated with one or more corner positions thereof making possible easier flexing thereof devoid of normally breaking or cracking pressure therein during one or more repeated closing to a retraction position over a period of numerous extensions and retractions.

Another object is to obtain a novel tape above-noted of alternate and/or preferred shapes, structures and performance.

Another object is to obtain a further novel casing as a composite with the extendable above-noted elongated tape, together with an additional novel supporting tape device providing even further improved resistance to potential bending, sagging and/or buckling of the tape measure's extended portion of the elongated tape, together with providing for retraction storage of the supporting tape device.

Other objects become apparent from the preceding and following disclosure.

SUMMARY OF THE INVENTION

Broadly the invention is directed to a self-supporting flexible extendable tape device. The flexible tape device broadly includes in a as a composite combination in a first embodiment, a first elongated tape of flexible composition having opposite upper and lower faces, having a longitudinal axis along a length of the first elongated tape. The first elongated tape has upper and lower faces extending between opposite first and second edges of the tape along the tape's longitudinal axis. The elongated tape has length-indicating indicia arranged along the longitudinal axis on at-least one of the upper and lower faces, and has a transverse axis constituting a width of the first elongated tape. There is at least a first substantially upright flange relative to the upper and lower faces, of the flexible composition and the flange(s) is/are of composition continuous and integral with at-least one of the first and second edges to an extent or such that the first flange braces and supports the first elongated tape.

In a preferred second embodiment as a variation on the first embodiment, the flange(s) extends continuously along the first elongated tape a predetermined distance of at-least two feet.

In a further alternate preferred third embodiment as a variation on the first embodiment, the flange(s) extends continuously along the first elongated tape a predetermined distance of at-least four feet.

In a further alternate preferred fourth embodiment as a variation on the third embodiment, there is included also a second substantially upright flange of the flexible composition continuous with a remaining other of the first and second edges integral with the remaining other of the first and second edges to an extent or such that the second substantially upright flange further supports and braces the first elongated tape. In a more preferred fourth embodiment as a variation on the third embodiment, the first substantially upright flange has opposite first substantially upright side faces. The first substantially upright flange and the one of the first and second edges jointly form a first corner junction forming a first inner-shaped corner and oppositely a first outer-shaped corner of substantially 270 degrees for an extended portion of the elongated tape. The first corner junction at the first outer-shaped corner includes a first outer slot running along the one of the first and second edges, with the first inner slot being positioned and the first corner junction being shaped and structured such that the first substantially upright flange is bendable at the first corner junction to a position at which the first substantially upright flange is positioned substantially parallel with the upper and lower faces with one of the second upright side faces being substantially flush with one of the upper and lower faces.

In a more preferred fifth embodiment as a variation on the fourth embodiment, the second substantially upright flange has opposite substantially upright side faces.

In a further or alternate sixth embodiment as a variation on the fifth embodiment, the second substantially upright flange and the other of the first and second edges form a second corner junction forming a second inner-shaped corner and oppositely a second outer-shaped corner of substantially 270 degrees for an extended portion of the elongated tape. The second corner junction at the second outer-shaped corner includes a second outer slot running along the other of the first and second edges, with the second outer slot being positioned and the second corner junction being structured such that the second substantially upright flange is bendable at the second corner junction to a position at which the second substantially upright flange is positioned substantially parallel with the upper and lower faces, with a remaining other the second upright side faces being substantially flush with one of the upper and lower faces.

In an alternate preferred seventh embodiment as a variation on the fourth embodiment, the first substantially upright flange has opposite first substantially upright side faces. Also the first substantially upright flange and the one of the first and second edges form a first corner junction forming a first inner-shaped corner and oppositely a first outer-shaped corner of substantially 270 degrees for an extended portion of the elongated tape. For this embodiment, the first corner junction is structured such that the first substantially upright flange is bendable at the first corner junction to a position at which the first substantially upright flange is positioned with the first substantially upright side faces substantially in linear alignment with the upper and lower faces. The second substantially upright flange has opposite second substantially upright side faces. The second substantially upright flange and the other of the first and second edges form a second corner junction forming a second inner-shaped corner and oppositely a second outer-shaped corner of substantially 270 degrees for an extended portion of the elongated tape. Each of the first and second substantially upright flanges have respectively first and second proximal and distal ends, and including a second elongated tape as an elongated connecting wall of the composition interconnecting and integral with the first and second distal ends such that the elongated connecting wall, the first elongated tape and the first and second substantially upright flanges form a four-sided elongated tube, the second corner junction being structured such that the second substantially upright flange is bendable at the second corner junction to a position at which the second substantially upright flange is positioned with the second substantially upright side faces substantially in linear alignment with the elongated connecting wall, and is positioned with the second substantially upright side faces substantially parallel with the upper and lower faces with a remaining other the second upright side faces substantially flush with one of the upper and lower faces.

In a more preferred or alternate eighth embodiment of the foregoing seventh embodiment, the first substantially upright flange at the first proximal end thereof is of increased thickness and at the first inner-shaped corner of junction of the first proximal end and the one of the opposite first and second edges, forming a first inner slot running along the one of the first and second edges. As a result thereof, the first substantially upright flange is prevented from bending further to a lesser inner angle with the one of the upper and lower faces.

In an alternate or a more preferred ninth embodiment as a variation on each of the preceding seventh and eighth embodiments, the second substantially upright flange at the second distal end thereof is of increased thickness, the second distal end and the elongated connecting wall forming a third corner including a third inner-shaped angle, with there being formed therein a second inner slot running along the third corner. As a result thereof, the second substantially upright flange is prevented from bending at the second distal end further to a lesser number of degrees of the third inner-shaped angle.

In an alternate preferred tenth embodiment as a variation on the seventh embodiment, the second substantially upright flange at the second distal end thereof is of increased thickness and forms a third corner having a outer-shaped angle up to about 270 degrees, having a second outer slot running along the elongated connecting wall. As a result thereof, the second substantially upright flange is prevented from bending at the second distal end further to make smaller the third outer-shaped angle with the elongated connecting wall.

In an alternate preferred eleventh embodiment with regard to the four-sided elongated tube of the seventh embodiment, the second first elongated tape at the second edge adjoining the substantially upright flange at the second proximal end thereof is of increased thickness, forming a third corner having a third obtuse angle up to about 270 degrees, and forming a outer third slot running along the second edge. As a result thereof, the second substantially upright flange is prevented from bending at the second proximal end further to make a lesser the third obtuse angle.

In an alternate preferred twelvth embodiment with regard to the four-sided elongated tube of the seventh embodiment as a variation on the seventh embodiment, the elongated connecting wall at one of the first and second distal ends is of increased thickness forming a third corner having a third obtuse angle up to about 270 degrees, and forming a third outer slot running along the elongated connecting wall. As a result thereof, the second substantially upright flange is prevented from bending at the second distal end further to make a lesser exterior obtuse angle with the elongated connecting wall.

In an alternate preferred thirteenth embodiment with regard to the four-sided elongated tube of the eighth embodiment, the second proximal end and the second edge form a third outer corner having a third outer corner angle, the third outer corner including a second outer slot running along the second edge and being structured to reduce shearing stress on the second outer corner when bent by pressure applied to the upper face to increase degrees of the third outer corner.

In an alternate preferred fourteenth embodiment with regard to each of the four-sided elongated tube of the ninth through the thirteenth embodiments, the second proximal end and the second edge form a fourth outer corner having a third outer corner angle, the fourth outer corner including a third outer slot running along the second edge and structured to reduce shearing stress on the second outer corner when bent by pressure applied to the upper face of the outer-angle of the fourth outer corner.

In an alternate preferred fifteenth embodiment with regard to the eight embodiment, the first distal end and the elongated connecting wall form a third outer corner having a third outer corner angle, the third outer corner including a second outer slot running along the second edge and being structured to reduce shearing stress on the second outer corner when bent by pressure applied to the upper face to cause an increased angle of a fourth outer corner of the four-sided elongated tube.

In an alternate preferred sixteenth embodiment with regard to variations on ninth through thirteenth, the first proximate end and the elongated connecting wall form a fourth outer corner having a fourth outer corner angle, the fourth outer corner including a third outer slot running along the elongated connecting wall and being structure to reduce shearing stress on the second outer corner when bent by pressure applied to the upper face to increase degrees of the fourth outer corner.

In an alternate preferred seventeenth embodiment as variations on prior embodiment, particularly the first, fourth and fifth embodiment, in which the bottom face is convexly shaped.

In an alternate preferred eighteenth embodiment as variations on the first, fourth, sixth, eighth, ninth, tenth, eleventh, twelvth, thirteenth, fourteenth, and fifteenth embodiments, the composition comprises substantially polypropylene plastic in a major amount.

In an alternate preferred nineteenth embodiment as variations on the first and fourth through fifteenth embodiments, there is included a casing having coiled therein the first elongated tape and the integral upright flange, the casing having a forward wall and having port structure forming a tape extension and retraction first port formed in the front wall. The port structure forms a port-circumscribing frame and guide structure adapted to fold and compact the first elongated tape and the upright flanges thereof during retraction suitably for storage in a substantially flattened state within the casing. The casing is further adapted to provide structural support to the first elongated tape and upright flanges thereof as to retain the first elongated tape and flanges in a supporting state such that the first elongated tape and upright flanges are self-supporting against collapsing downwardly when extended.

In an alternate preferred twentieth embodiments a variation on the first embodiment, there is included an extendable and retractable substantially flexible second elongated tape sufficiently flexible as to be adapted to be rolled or bent during retraction to a storage state within the casing. The second elongated tape also is sufficiently rigid as to provide partial support to the first elongated tape when both the first and second elongated tapes are in extended states. Also, the port-forming structure forms a second extension and retraction port at a position below the first extension and retraction port with the second elongated tape mounted retractably through the second port and is adapted to retractably channel the second elongated tape into the casing in a compacted or folded state.

In an alternate preferred twenty-first embodiment as a variation on the seventh, eighth and ninth embodiments, there is included an extendable and retractable substantially flexible third elongated tape sufficiently flexible as to be adapted to be roller or bend during retraction to a storage state within the casing. The flexible third elongated tape is sufficiently rigid as to provide partial support to the first elongated tape when both the first and second elongated tapes are in extended states. The port-forming structure forms a second extension and retraction port at a position below the first extension and retraction port with the third elongated tape mounted retractably through the second port and adapted to retractably channel the third elongated tape into the casing in a compacted or folded state.

The invention may be better understood by making reference to the following figures and drawings thereof.

THE FIGURES

FIG. 1A' diagrammatically illustrates the same embodiment as FIG. 1A, illustrating a top plan in-part view thereof.

FIG. 1B' diagrammatically illustrates the same embodiment as FIG. 1B, illustrating a top plan in-part view thereof.

FIG. 3' diagrammatically illustrates the same embodiment as FIG. 3, illustrating a top plan in-part view.

FIG. 4' diagrammatically illustrates the same embodiment as FIG. 4, illustrating a top plan in-part view.

DETAILED DESCRIPTION

For the present invention, the mechanisms of extension and retraction are well known prior art, including any one or more of retraction springs, cranks for cranking out or in a tape to be retracted or extended, button-like or other locking devices in the nature of typically some ratchet or other equivalent mechanism to prevent retraction by a spring prior to release by typically the pressing of a central or other button or lever, and the like. Accordingly, such technology is conventional, together with technology represented by the preceding cited prior art, and it is within the scope of this invention to make use of such technology, the present invention not being such matters and not requiring independent extensive disclosure thereof herein.

In the following description for various embodiments, for common and/or analagous parts and/or elements discloses and described for the various alternate and/or preferred embodiments, common or related indicia are utilized in the identification thereof in order to facilitate easy following and understanding of the relationship from one embodiment to another. Once a part or element or combination of elements is identified in one embodiment, description is not repeated for other embodiments except in such instances where to do so improves clarity and ease of understanding and following the description.

Figure 1A:
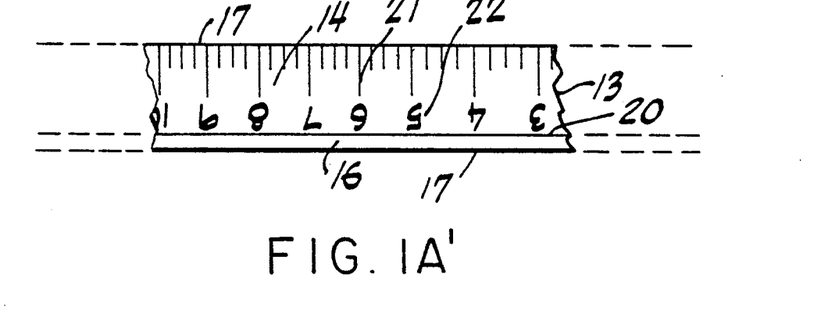
FIG. 1A diagrammatically illustrates a side cross-sectional view of an embodiment of the invention, across a width of the elongated measuring tape structure.

FIGS. 1A and 1A' disclose different views of a common embodiment. FIG. 1A in its diagrammatic illustration of a side cross-sectional view of an embodiment of the invention, across a width of the elongated measuring tape structure with the width along a transverse axis thereof, discloses a width view of the elongated tape 13 with its upper face 14 and its lower face 15. Along one elongated edge thereof there is illustrated an integral (continuing, unified structure) upright flange 16 having outer face 17 and inner face 18. At the corner junction of the elongated tape 13 and the upright flange 16 at a lower base position of the flange 16 and its outer face 17 the location of meeting the converging above-noted lower face 15 there is an angular slot defined (formed) in the thickness—the slot 19 running along the longitudinal axis of each of the elongated tape 13 and the upright flange 16. The opposite elongated longitudinally-extending edge of the tape measure tape structure is edge 17'. The slot extends through typically up to about one-half the thickness of the lower face 15 and the upright flange 16 respectively. The function of the slot typically is to reduce shearing or breaking or tearing stress(es) when the upright flange becomes pressed downwardly during the retraction thereof into a storage casing. While in this and other preferred embodiments of the invention the composition of the elongated tape 15 and the upright flange is/are polypropylene (plastic), other plastics and/or substantially flexible metal(s) that inherently have some sufficient rigidity to add sturdiness against sagging when employed in reasonable thickness suitable for the illustrated tapes and flanges of this invention may be utilized exclusively and/or in combination, such as a plastic coating(s) of a flexible or composition (substantially rigid with some varying degree of resiliency). The particular and special reason for polypropylene as preferred arises from the inherent physio-chemical nature of polypropylene to readily flex (if not too thick) in the nature of a resilient hinge, together with the well known conventional prior art fact that polypropylene when flexed becomes increasingly stable against breaking-off or shearing or tearing or the like while becoming more susceptible to future flexing, whereby repeated to and fro flexing of the present invention's upright flange from it normal upright position to a bent-over position remains and become more stable and durable over prolonged and increased usage such retraction and extension of the tape measure tape structure to and from a storage tape measure casing such as illustrated and claimed in other embodiments of this invention. The presence of the slot 19 in a polypropylene embodiment of the FIGS. 1A and 1A' results in further durability over repeated and prolonged usage. The upright flange's inner face 18 and the elongated tape's upper face 14 define the normally existing angle 20 that exists except when the flange is forcefully bent-over by pressure externally exerted thereon. The function of the upright flange is that it offers and provides sturdiness and strength against bending or sagging of the tape measure tape structure when in various degrees of extension to varying lengths—i.e. directed toward the achieving of aforestated objects.

FIG. 1A' additionally illustrates the upper face's calibrations 21 extending along the previously described edge 17', with identifying indicia 22.

Figure 2A:
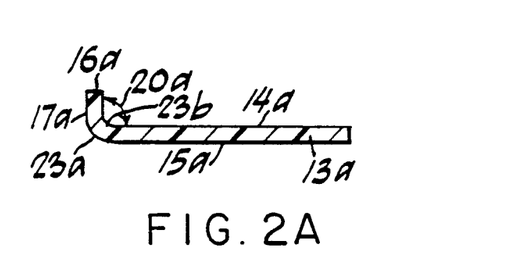
FIG. 2A diagrammatically illustrates a side cross-sectional view of another embodiment of the invention, across a width of the elongated tape.
Figure 2B:
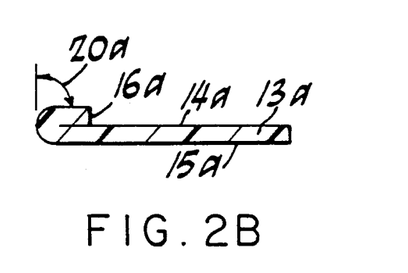
FIG. 2B diagrammatically illustrates a side cross-sectional view of the FIG. 2A embodiment of the invention, across a width of the elongated tape, with the upright flange illustrated in a depressed state to be substantially flush with and parallel with the elongated tape.

FIG. 2A illustrating an alternate embodiment has substantially corresponding structure to that of FIGS. 2A and 2B except for the rounded outer corner 23a and the rounded inner corner 23b with regard to the relationship of the upright flange to the elongated tape. Each and/or both of the rounded outer corner 23a and the rounded inner corner 23b serve(s) to reduce stress(es) that otherwise if sharp-corner(s) would tend to be more susceptable to breaking, shearing, tearing or the like responsive to bending or folding-over the upright flange during retraction to and while storage.

Figure 1B:
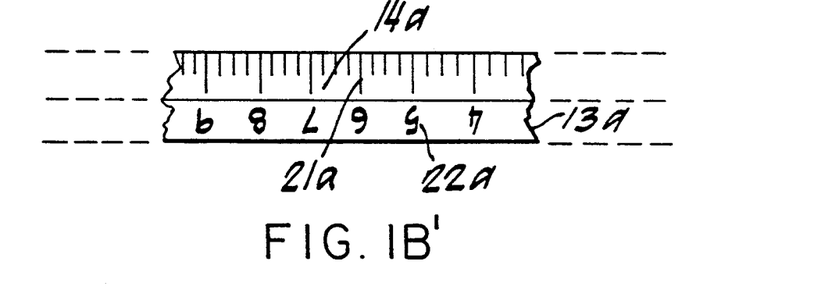
FIG. 1B diagrammatically illustrates a side cross-sectional view of the FIG. 1A embodiment of the invention, across a width of the elongated measuring tape structure, with the upright flange illustrated in a depressed state to be substantially flush with and parallel with the elongated tape.

FIG. 2B illustrates the position of the flange as it would appear in a stored state within the casing of this invention and/or when depressed to a folded-over or bent state suitably for storage of the tape measure tape structure. The embodiment of FIG. 2B would correspond in appearance in a top plan view thereof, to the FIG. 1B' illustration of the FIG. 1B embodiment.

Figure 3:
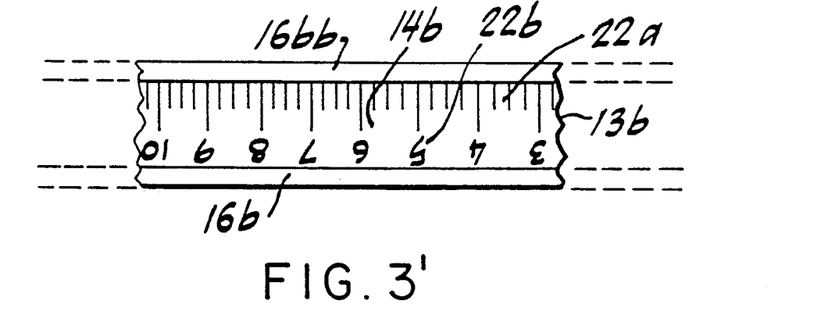
FIG. 3 diagrammatically illustrates another embodiment of the invention, in a side cross-sectional view across a width of the elongated tape.

FIG. 3 illustrates an embodiment analagous to that of the embodiment of FIG. 1A, except that this embodiment includes upright flanges 16b and 16bb, one thereof at each of opposite edges of the elongated tape with each flange extending along the longitudinal axis of the elongated tape 13b, and each of the opposite edge corners having one of the above-described slot, here being slots 19b and 19bb.

FIG. 3' corresponds to the FIG. 1A' embodiment view except the FIG. 3 embodiment as disclosed in FIG. 3' illustrating the top plan view appearance of this tape measure tape structure having each of both the above-noted upright flanges 16b and 16bb at the opposite edges of the elongated tape 13b.

Figure 4:
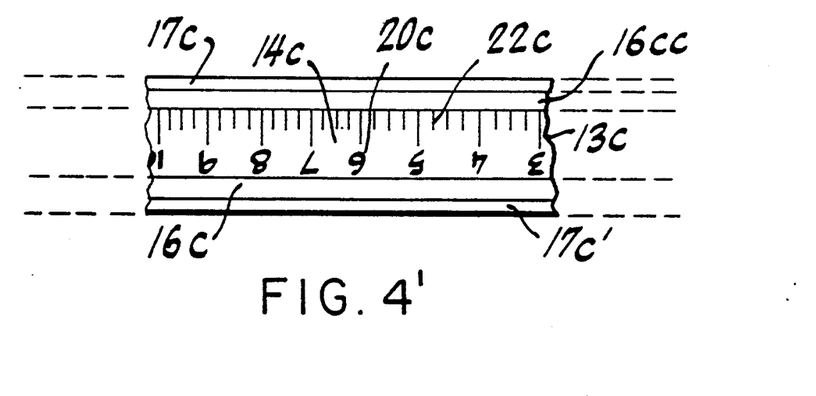
FIG. 4 diagrammatically illustrates another embodiment of the invention, in a side cross-sectional view across a width of the elongated tape.

FIG. 4 illustrates an embodiment analagous to that of the embodiment of FIG. 3, also including upright flanges 16c and 16cc, one thereof at each of opposite edges of the elongated tape with each flange extending along the longitudinal axis of the elongated tape 13c, and each of the opposite edge corners having one of the above-described slot, here being slots 19c and 19cc. This embodiment has enlarged base-portions (proximal ends) of the upright flange(s) thereof, further improving the sturdiness and strength of the respective upright flanges in their respective beneficial contributions of resistance against bending and/or buckling of the elongated tape 13c of the tape measure tape structure when in an extended state at any of variable lengths of extension from a storage casing.

FIG. 4' illustrates a view comparable to that of FIG. 3', except in this top plan view the slanted sides 17c and 17c' being viewable.

Figure 5A:
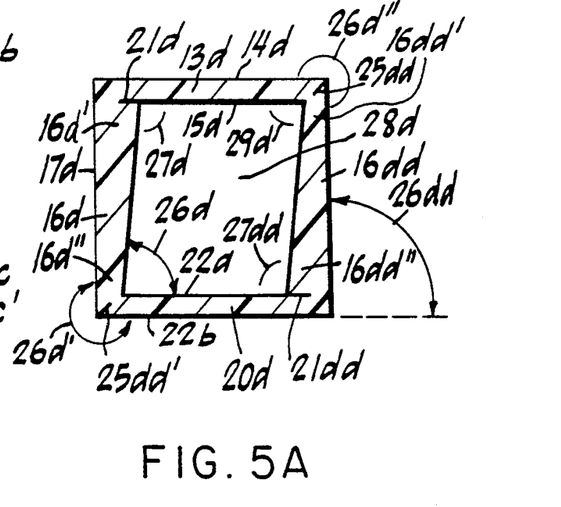
FIG. 5A diagrammatically illustrates a four-sided tubular other embodiment of the invention illustrated in a cross-sectional view across the elongated tape measure tape structure.

FIG. 5A illustrates an embodiment in which the upright flanges 16d and 16dd connect at proximal ends 16d' and 16dd' and extend downwardly from the elongated tape 13d having its upper face 14d on which calibrations and indicia are printed the same as shown in FIG. 1A' embodiment for its upper face 14d. From the FIG. 5A embodiment lower-positioned elongated connecting wall 20d with its lower face 22b, connecting at opposite side edges each respective to different ones of the upright flanges 16d and 16dd at the distal ends 16d" and 16dd" thereof, thereby forming a four-sided tubular structure. This embodiment exhibits an additional feature of the diagonally-spaced apart inner slots 21d and 21dd diagonally spaced from one-another therein being formed as a result of selectively-placed (located) enlarged thicknesses of the proximal end 16d' and distal end 16dd forming a slot 21d between an inner portion of the enlarged proximal end 16d' and (relative to) the lower face 15d, and likewise forming a slot 21dd between an inner portion of the enlarged distal end 16dd and relative to the upper face 22a of the elongated connecting wall 20d. As a result of these enlarged portions, with regard to the expanded (normal position when extended) shape and position of this embodiment when in an extended state (not depressed and/or stored) as shown in this FIG. 5A, the four-walled tubular structure is prevented from flexing the upright flanges 16d and 16dd in a counter-clockwise direction (relative to the distal ends-connection points with the elongated connecting wall 20d) beyond the positions shown. As a result thereof, considering that the normal positions of the upright flanges 16d and 16dd are as shown (not in a flattened depressed state and/or position as would be depressed for storage) and considering that additionally in a further preferred embodiment the casing port is shaped at its outer portion to lend support to the flange 16d or 16dd pressing in the counter-clockwise direction to counter any potential tendency to flex in a collapsing clockwise direction responsive to stress(es) arising from the weight of an extended portion of the tape measure tape structure. Accordingly, the beneficial results of one or more of these features of this embodiment is to provide a substantially greater and enhanced resistance to bending or kinking or the like when in an extended state at any of varying degrees of extension from a retracted state. While the four walls of the tubular structure are diagrammatically illustrated as squared, i.e. of each length dimensions, it is not essential nor critical that the upright flanges be of the same height dimensions as the width(s) of the elongated tape and/or the elongated connecting wall. Outer slots 25dd and 25dd' and inner slots 21dd and 21d permits the respective corners to be flattened to the state illustrated in FIG. 5B through angles 26dd' and 26dd as angles 27d and 27dd open-up from 90 degrees to approximately 180 degrees while closing angle 29d, and obtuse angle 26d' and 26d" each opens from about 270 degrees to about 360 degrees. The through-space 28d is formed by the joined four walls.

Figure 5B:
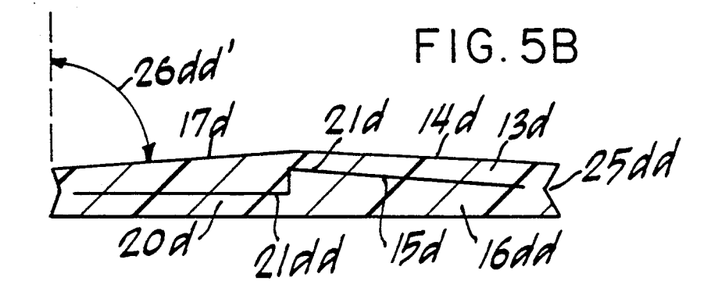
FIG. 5B diagrammatically illustrates the same embodiment as FIG. 5A, in a depressed flattened state, shown also in the same cross-sectional view across the elongated tape measure tape structure.

FIG. 5B illustrates the appearance of the embodiment of FIG. 5A when (after) being depressed (and held in the depressed state and position) to a depressed state and position suitable for storage in a retracted state within a casing, noting that the enlarged portions of the diagonally opposite proximal flange end 16d''' meshes or snugly-fits with the distal flange end 16dd''', thereby allowing the entire four-sided tubular structure to be more flatly depressed for and during storage within a storage casing during retraction.

Figure 6A:
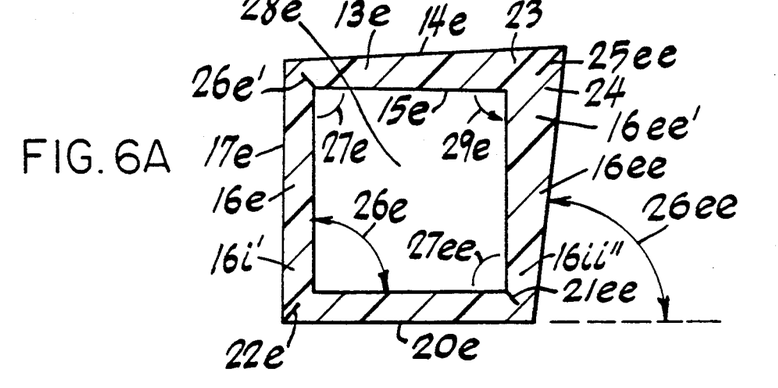
FIG. 6A diagrammatically illustrates an alternate embodiment of a four-sided tubular tape measure structure of this invention in a cross-sectional view across the elongated tape measure tape structure.

FIG. 6A diagrammatically illustrates a variation and improvement on the embodiment of FIG. 5A, this arrangement allowing the four sided tubular structure formed to be pressed to a different flattened shape more easily stored within a tape measure casing. As well this embodiment is more easily manufactured with regard to the outer slot 25ee' being formed by the opposing thickened portion 23 of the elongated tape 13e and the flange thickened portion 24 of the proximal end 16ee' of the upright flange 16ee. Flange proximal end 16ee' of flange 16ee corresponds to proximal end 16dd' of the FIG. 5A embodiment, flange distal end 16i' of flange 16e corresponds to flange distal end 16d" of FIG. 5A embodiment, outer slots 25ee' and 21ee respectively are defined between the opposite ends of the elongated connecting wall 20e and the flange distal ends 16i' and 16ii" respectively, and inner slot 26e' is defined between flange proximal end 17e of flange 16e and the elongated tape 13e, and through-space channel 28e corresponds to the through-space channel 28d of FIG. 5. Angles 26e and 26ee respectively represent the angle degrees through which the flanges 16e and 16ee are pivotable to acquire the collapsed state illustrated in FIG. 6B of which the FIG. 6B open-slot 21ee and 26e' respectively corresponds to and is the same closed-slots 21ee and 26e' respectively of FIG. 6A in which the flanges 16e and 16ee are each in the upright position.

Figure 6B:
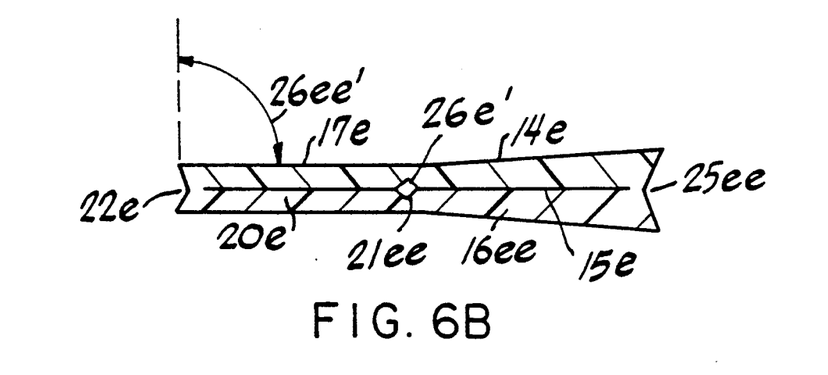
FIG. 6B diagrammatically illustrates the same embodiment as FIG. 6A, in a depressed flattened state, shown also in the same cross-sectional view across the elongated tape measure tape structure.

FIG. 6B diagrammatically illustrates the depressed (and held/sustained-pressure) state of the FIG. 6A embodiment.

Figure 7A:
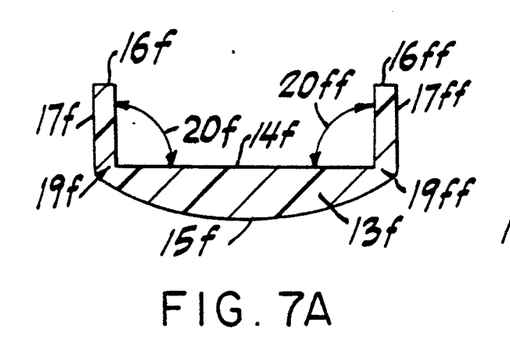
FIG. 7A diagrammatically illustrates another embodiment of the tape measure of this invention, shown in a cross-sectional view across the elongated tape measure tape structure.

FIG. 7A diagrammatically illustrates an embodiment basically similar to but an improvement on the embodiments of FIGS. 1A and/or 3, in which the lower face 15f is convexly shaped together (in combination) with the upper face 14f being linear across the width resulting in substantial thickening of the elongated tape, adding even additional strength and resistance of the overall tape measure tape structure against potential buckling, bending or the like. It is contemplated also that this illustrated feature may be utilized for the embodiment of FIG. 1A to have solely a single upright flange.

Figure 7B:
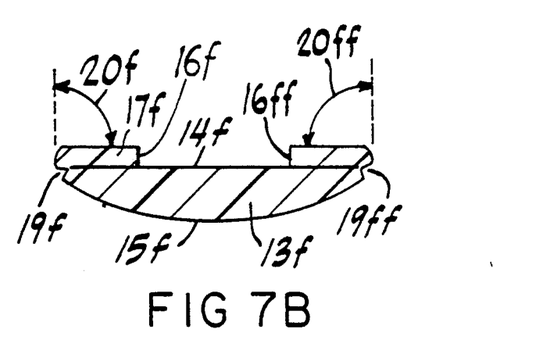
FIG. 7B diagrammatically illustrates another embodiment the same as illustrated in FIG. 7A, in a depressed flattened state, shown also in the same cross-sectional view across the elongated tape measure tape structure.

FIG. 7B diagrammatically illustrates the depressed (and held/sustained-pressure) state of the FIG. 7A embodiment, and correspond in appearance to the foregoing FIG. 3'.

Figure 8:
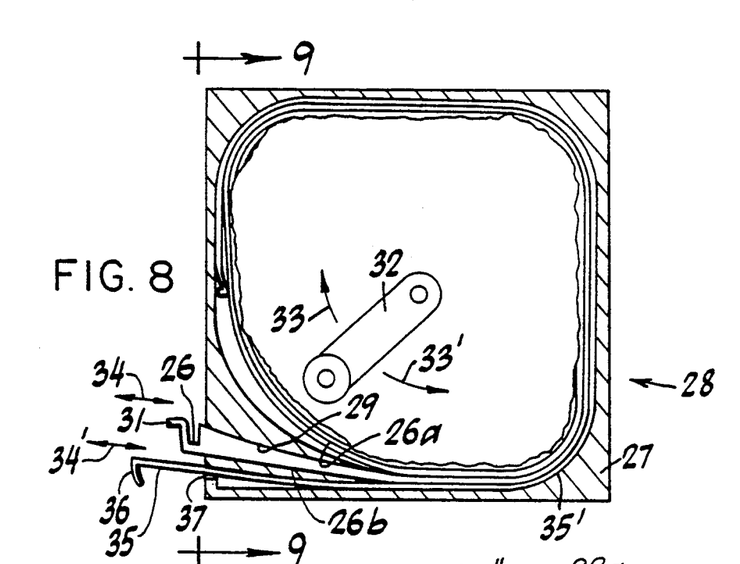
FIG. 8 diagrammatically illustrates a side view with partial cut-away of the tape measure casing and tape measure and supporting tapes coiled retractably therein, of the present invention in a preferred embodiment thereof.

FIG. 8 diagrammatically illustrates a novel tape measure tape structure 26 in novel combination 28 with a novel retraction storage casing 27 therefor having the tape measure tape structure 26a and b in a retracted state and stored therein, with the tape measure tape structure extending through the extension and retraction casing port 29, adapted for movement in alternate directions 34 typically by grasping and pushing or pulling the tape handle 31 or by using the crank in one of opposite directions 33 and 33', or the like. Likewise, tape 35 may be grasped by handle 36 to move the tape 35 in either of alternate directions 34'. In another embodiment illustrated in the novel combination 28, there is included the above-noted extendable and retractable substantially flexible second elongated tape 35 sufficiently flexible as to be adapted to be rolled or bent during retraction to a storage state within said casing. This tape 35 is sufficiently rigid as to provide partial support to any sagging extended portion of the first elongated tape 26 when all of the elongated tapes are in extended states. As above-noted, the tape 26 extends through the port 29, while the tape 35 extends through the extension and retraction port 37 located at a position below the first extension and retraction port 29. As viewable in FIG. 8, the second elongated tape 35 is mounted retractably through said second port 37 with its distal end directed slightly upwardly such that when both tapes are extended, the tape of above-noted greater rigidity lends support whenever under its extended weight the tape 35 would otherwise tend to sag.

Figure 9:
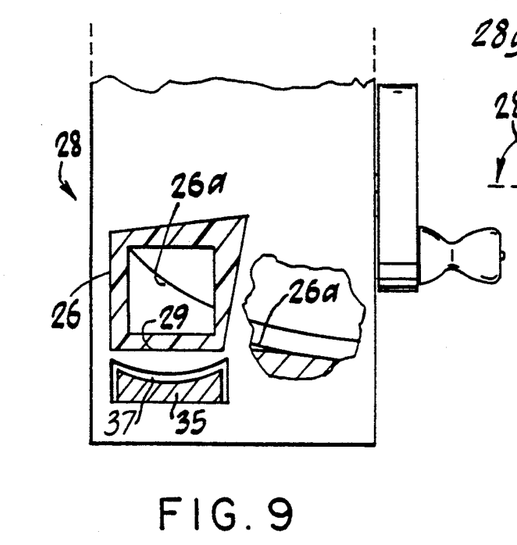
FIG. 9 diagrammatically represents the same embodiment as that of FIG. 8, as taken along line 9—9 of FIG. 8.

FIG. 9 diagrammatically illustrates the same embodiment as FIG. 8, as taken along lines 9—9 of FIG. 8. This FIG. 9 better illustrates the appearance of the port 29 and the tape structure 26 in its shape and its inside downwardly-pressed shape by virtue of the converging upper wall within the casing just inside the port 29, such that the tape structure 26 eventually becomes flattened as shown as 26a in the cut-away portion.

Figure 10:
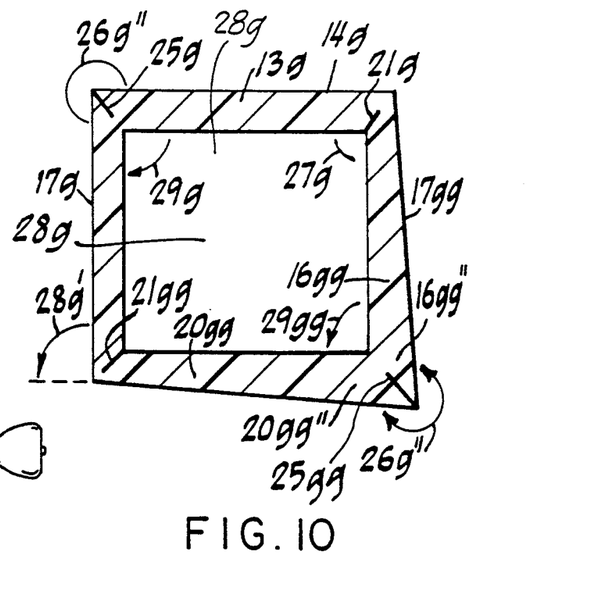
FIG. 10 diagrammatically illustrates a cross-sectional view of an alternate embodiment of the four-sided tape measure tape structure as contrasted to the embodiments of FIGS. 5A and 5B.

FIG. 10 diagrammatically illustrates another alternate embodiment as compared to those of FIGS. 5A and 6A, the FIG. 10 embodiment corresponding substantially to that of FIG. 6A, except that the corner junction of adjacently thickened converging (intersecting) wall portions constitute the distal end thickened portion 16gg" of upright flange 16gg and edge portion 20gg" of the elongated connection wall 20gg.

Figure 11:
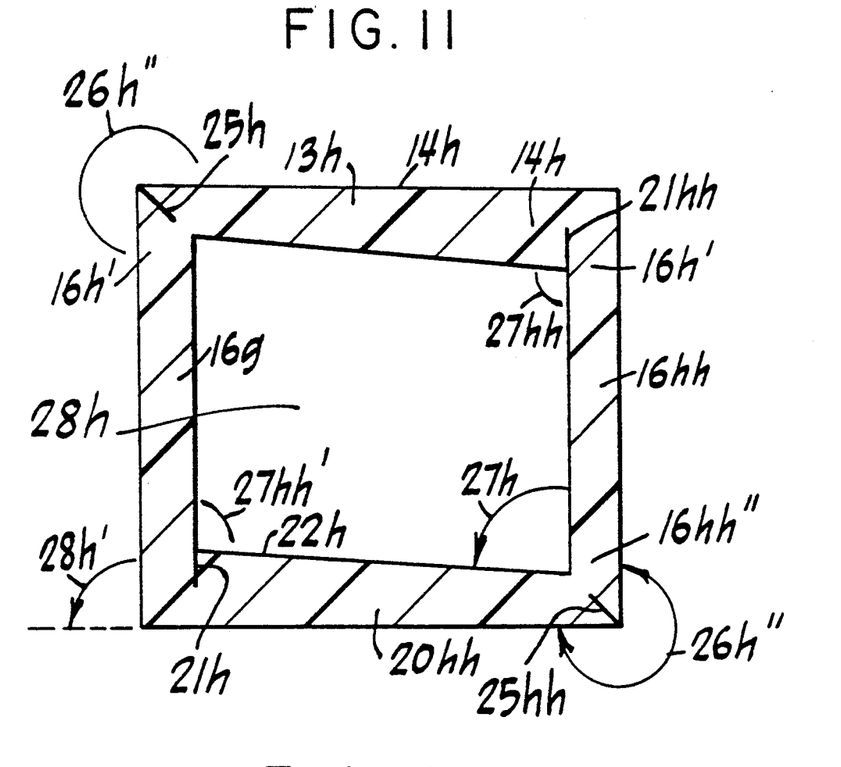
FIG. 11 diagrammatically illustrates a cross-sectional view of an alternate embodiment of the four-sided tape measure tape structure as contrasted to the embodiments of FIGS. 5A, 5B and 10.

FIG. 11 diagrammatically illustrates another alternate embodiment basically similar to that of FIG. 5A except that the thickened portions of the four walls are the upper wall, i.e. the elongated tape at 14h forming the slot 21hh and diagonally across therefrom, the thickened portion at 22h of the connecting wall 20hh.

Figure 12:
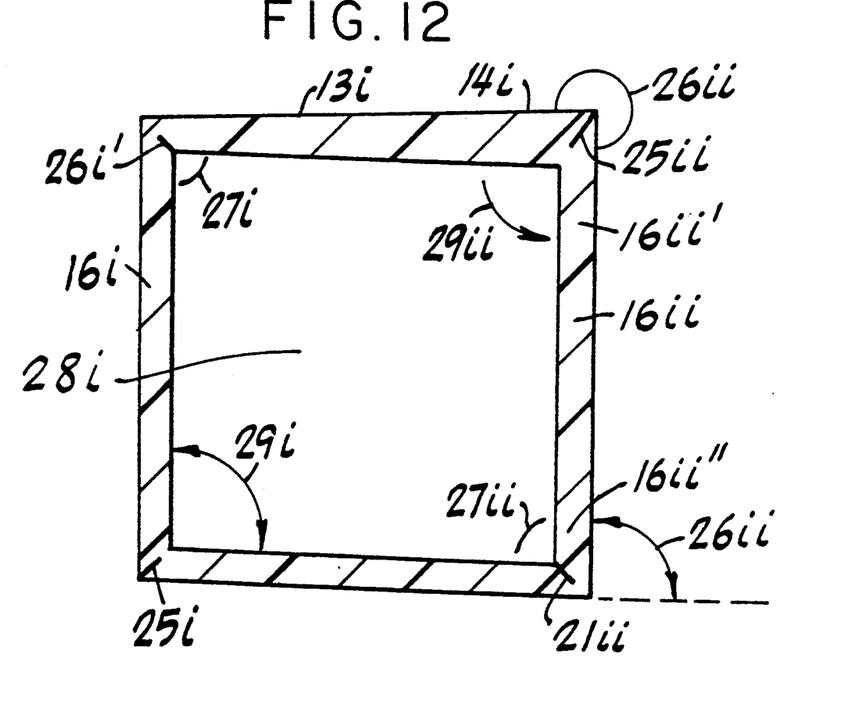
FIG. 12 diagrammatically illustrates a cross-sectional view of an alternate embodiment of the four-sided tape measure tape structure as contrasted to the embodiments of FIGS. 5A, 5B, 10 and 11.

The FIG. 12 diagrammatically illustrates an alternate embodiment is basically similar to the embodiment of FIG. 6A, except that solely the elongated tape at 14i is thickened together with its outer corner slot 25ii.

While the benefits of the present invention in its various embodiments, applies to short elongated tape structures and/or extensions (from the retracted to extended state from the storage casing thereof) of minor distances of less than two feet, the notoreous problems of buckling and difficulties of preventing bending or buckling and of working expeditiously and speedily involve longer (further) states of extention of at-least two feet, particularly of four or more feet. Accordingly, the various embodiment of this invention are directed especially to achieve the benefits of these longer states of extension from the storage casing as set forth in preceding objects and background discussion.

As previously noted, while any appropriate metal or plastic or, for example, plastic-coated metal, or even metal having an elongated plastic insert, the principles of the working invention as discussed in preceding embodiments remain the same, and are within the scope of this invention. Likewise, it is within the scope and spirit of this invention to make other variations and modifications within the skill of an ordinary artisan, and/or to make obvious substitution of equivalents or the like.

I claim:

1. A self-supporting flexible extendable tape device comprising in combination: a substantially rigid first elongated tape of flexible composition having opposite upper and lower faces, having opposite first and second edges, having a longitudinal axis along a length of the first elongated tape with the upper and lower faces extending as a width between said opposite first and second edges along the longitudinal axis, having length-indicating indicia arranged along the longitudinal axis, and having a transverse axis constituting said width of the first elongated tape, and at least a first substantially upright flange relative to and extending from said first elongated tape, said first substantially upright flange being of said flexible composition and substantially continuous with said flexible composition of said first elongated tape at at-least one of said first and second edges such that said first flange braces and supports said first elongated tape against bending along said longitudinal axis from weight of extended portions of the first elongated tape when in an extended state, and a second substantially upright flange of said flexible composition continuous with a remaining other of said first and second edges such that said second substantially upright flange further supports and braces said first elongated tape along said longitudinal axis when in an extended state, said first substantially upright flange having opposite first substantially upright side faces and in which said first substantially upright flange and said one of said first and second edges form a first corner junction forming a first inner-shaped corner and oppositely a first outer-shaped corner, said first corner junction being structured such that said first substantially upright flange is bendable at said first corner junction to a position at which the first substantially upright flange is positioned with said first substantially upright side faces substantially in linear alignment with said upper face, and said second substantially upright flange having opposite second substantially upright side faces and in which said second substantially upright flange and said other of said first and second edges form a second corner junction forming a second inner-shaped corner and oppositely a second outer-shaped corner of substantially 270 degrees, in which each of said first and second substantially upright flanges have respectively first and second proximal and distal ends, and including a second elongated tape as an elongated connecting wall of said flexible composition interconnecting and continuous with said flexible composition of said first and second substantially upright flanges at said first and second distal ends thereof such that said elongated connecting wall, said first elongated tape and said first and second substantially upright flanges form a four-sided elongated tube, said second corner junction being structured such that said second substantially upright flange is bendable at said second corner junction to a position at which the second substantially upright flange is positioned with said second substantially upright side faces substantially in linear alignment with said elongated connecting wall, and is positioned with one of said second substantially upright side faces substantially parallel with said upper face with a remaining other of said second upright side faces substantially flush with said upper face, said first substantially upright flange at said first proximal end thereof being of increased thickness and said first inner-shaped corner junction of the first proximal end and said first edge, forms a first inner slot running along said first edge such that said first substantially upright flange is prevented from bending to reduce said first inner-shaped corner to a lesser inner angle with said upper face.

2. A self-supporting flexible extendable device according to claim 1, in which said second substantially upright flange at said second distal end thereof is of increased thickness, said second distal end and said elongated connecting wall forming a third inner-shaped corner including a third inner-shaped angle, with there being formed therein a second inner slot running along said third inner-shaped corner such that said substantially upright flange is prevented from bending at said second distal end further to a lesser angle.

3. A self-supporting flexible extendable device according to claim 2, in which said second substantially upright flange includes said second proximal end continuous with said second edge to form said second outer-shaped corner, said second outer-shaped corner including a first outer slot running along said second edge structured to reduce shearing stress on said second outer shaped corner when bent by pressure applied to said second substantially upright flange in order to decrease angle within said first inner-shaped corner.

4. A self-supporting flexible device according to claim 3, in which said composition comprises substantially polypropylene in a major amount.

5. A self-supporting flexible device according to claim 3, including a casing having coiled therein said first elongated tape and said first substantially upright flange, said casing having a forward wall and having port structure forming a tape extension and retraction first port formed in said front wall, the port structure forming a port-circumscribing frame and guide structure adapted to fold and compact the first elongated tape and the upright flanges thereof during retraction suitably for storage in a substantially flattened state within the casing, and further adapted to provide structural support to the first elongated tape and upright flanges thereof as to retain the first elongated tape and flanges in a supporting state such that the first elongated tape and upright flanges are self-supporting against collapsing downwardly when extended.

6. A self-supporting flexible extendable device according to claim 2, in which said first distal end of said first substantially upright flange and said elongated connecting wall form a third outer-shaped corner, said third outer-shaped corner including a first outer slot running along said third outer-shaped corner and structured to reduce shearing stress on said first outer-shaped corner when bent by pressure applied to said upper face to increase angle within said first outer-shaped corner.

7. A self-supporting flexible device according to claim 2, in which said composition comprises substantially polypropylene in a major amount.

8. A self-supporting flexible device according to claim 2, including a casing having coiled therein said first elongated tape and said integral upright flange, said casing having a forward wall and having port structure forming a tape extension and retraction port formed in said front wall, the port structure forming a port-circumscribing frame and guide structure adapted to fold and compact the first elongated tape and the upright flanges thereof during retraction suitably for storage in a substantially flattened state within the casing, and further adapted to provide structural support to the first elongated tape and upright flanges thereof as to retain the first tape and flanges in a supporting state such that the first elongated tape and upright flanges are self-supporting against collapsing downwardly when extended.

9. A self-supporting flexible extendable device according to claim 1, in which said second substantially upright flange includes said second proximal end continuous with said second edge to form said second outer-shaped corner, said second outer-shaped corner including a first outer slot running along said second edge and structured to reduce shearing stress on said second outer-shaped corner when bent by pressure applied to said second substantially upright flange in order to decrease angle within said first inner-shaped corner.

10. A self-supporting flexible device according to claim 9, in which said composition comprises substantially polypropylene in a major amount.

11. A self-supporting flexible device according to claim 9, including a casing having coiled therein said first elongated tape and said first substantially upright flange, said casing having a forward wall and having port structure forming a tape extension and retraction port formed in said front wall, the port structure forming a port-circumscribing frame and guide structure adapted to fold and compact the first elongated tape and the upright flanges thereof during retraction suitably for storage in a substantially flattened state within the casing, and further adapted to provide structural support to the first elongated tape and upright flanges thereof as to retain the first tape and flanges in a supporting state such that the first elongated tape and upright flanges are self-supporting against collapsing downwardly when extended.

12. A self-supporting flexible extendable device according to claim 1, in which said first distal end of said first substantially upright flange and said elongated connecting wall form a third outer-shaped corner, said third outer-shaped corner including a first outer slot running along said third outer-shaped corner and structured to reduce shearing stress on said first outer-shaped corner when bent by pressure applied to said upper face to increase angle within said first outer-shaped corner.

13. A self-supporting flexible device according to claim 12, in which said composition comprises substantially polypropylene in a major amount.

14. A self-supporting flexible device according to claim 1 in which said composition comprises substantially polypropylene in a major amount.

15. A self-supporting flexible device according to claim 1, including a casing having coiled therein said first elongated tape and said integral upright flange, said casing having a forward wall and having port structure forming a tape extension and retraction port formed in said front wall, the port structure forming a port-circumscribing frame and guide structure adapted to fold and compact the first elongated tape and the upright flanges thereof during retraction suitably for storage in a substantially flattened state within the casing, and further adapted to provide structural support to the first elongated tape and upright flanges thereof as to retain the first elongated tape and flanges in a supporting state such that the first elongated tape and upright flanges are self-supporting against collapsing downwardly when extended.

16. A self-supporting flexible device according to claim 1, including a casing having coiled therein said first elongated tape and said integral upright flange, said casing having a forward wall and having port structure forming a tape extension and retraction first port formed in said front wall, the port structure forming a port-circumscribing frame and guide structure adapted to fold and compact the first elongated tape and the upright flanges thereof during retraction suitably for storage in a substantially flattened state within the casing, and further adapted to provide structural support to the first elongated tape and upright flanges thereof as to retain the first elongated tape and flanges in a supporting state such that the first elongated tape and upright flanges are self-supporting against collapsing downwardly when extended, and including an extendable and retractable substantially flexible third elongated tape positioned below the first elongated tube when the first and second elongated tapes are extended, the second elongated tape being sufficiently flexible as to be adapted to be rolled or bent during retraction to a storage state within said casing and sufficiently rigid and angled sufficiently upwardly in direction of extension as to provide partial support to any sagging extended portion of the first elongated tape when both the first, second and third elongated tapes are in extended states and in which said port-forming structure forms a second extension and retraction port at a position below said first extension and retraction port with the third elongated tape mounted retractably through said second port and adapted to retractably channel said third elongated tape into said casing in a compacted or folded state.

17. A self-supporting flexible extendable tape device comprising in combination: a substantially rigid first elongated tape of flexible composition having opposite upper and lower faces, having opposite first and second edges, having a longitudinal axis along a length of the first elongated tape with the upper and lower faces extending as a width between said opposite first and second edges along the longitudinal axis, having length-indicating indicia arranged along the longitudinal axis, and having a transverse axis constituting said width of the first elongated tape, and at least a first substantially upright flange relative to and extending from said first elongated tape, said first substantially upright flange being of said flexible composition and substantially continuous with said flexible composition of said first elongated tape at at-least one of said first and second edges such that said first flange braces and supports said first elongated tape against bending along said longitudinal axis from weight of extended portions of the first elongated tape when in an extended state, and a second substantially upright flange of said flexible composition continuous with a remaining other of said first and second edges such that said second substantially upright flange further supports and braces said first elongated tape along said longitudinal axis when in an extended state, said first substantially upright flange having opposite first substantially upright side faces and in which said first substantially upright flange and said one of said first and second edges form a first corner junction forming a first inner-shaped corner and oppositely a first outer-shaped corner, said first corner junction being structured such that said first substantially upright flange is bendable at said first corner junction to a position at which the first substantially upright flange is positioned with said first substantially upright side faces substantially in linear alignment with said upper face, and said second substantially upright flange having opposite second substantially upright side faces and in which said second substantially upright flange and said other of said first and second edges form a second corner junction forming a second inner-shaped corner and oppositely a second outer-shaped corner of substantially 270 degrees, in which each of said first and second substantially upright flanges have respectively first and second proximal and distal ends, and including a second elongated tape as an elongated connecting wall of said flexible composition interconnecting and continuous with said flexible composition of said first and second substantially upright flanges at said first and second distal ends thereof such that said elongated connecting wall, said first elongated tape and said first and second substantially upright flanges form a four-sided elongated tube, said second corner junction being structured such that said second substantially upright flange is bendable at said second corner junction to a position at which the second substantially upright flange is positioned with said second substantially upright side faces substantially in linear alignment with said elongated connecting wall, and is positioned with said second substantially upright side faces substantially parallel with said upper face with a remaining other of said second upright side faces substantially flush with the bottom of said second elongated tape, said second substantially upright flange at said second distal end thereof being of increased thickness, said second distal end and said elongated connecting wall forming a third inner-shaped corner, with there being formed a first inner slot running along said third inner-shaped corner such that said second substantially upright flange is prevented from bending at said second distal end further to a lesser angle.

18. A self-supporting flexible extendable device according to claim 17, in which said second substantially upright flange includes said second proximal end continuous with said second edge to form said second outer-shaped corner having a first outer-shaped angle, said second outer-shaped corner including a first outer slot running along said second edge and structured to reduce shearing stress on said second outer-shaped corner when bent by pressure applied to said second substantially upright flange in order to decrease angle within said first inner-shaped corner.

19. A self-supporting flexible extendable device according to claim 17, in which said distal end of said first substantially upright flange and said elongated connecting wall form a third outer shaped corner, said third outer-shaped corner including a first outer slot running along side third outer-shaped corner and structured to reduce shearing stress on said first outer-shaped corner when bent by pressure applied to said upper face to increase angle of said outer-shaped corner.

* * * * *